P. HIEN.
AUXILIARY VEHICLE SPRING.
APPLICATION FILED FEB. 14, 1914.
1,208,157.
Patented Dec. 12, 1916.
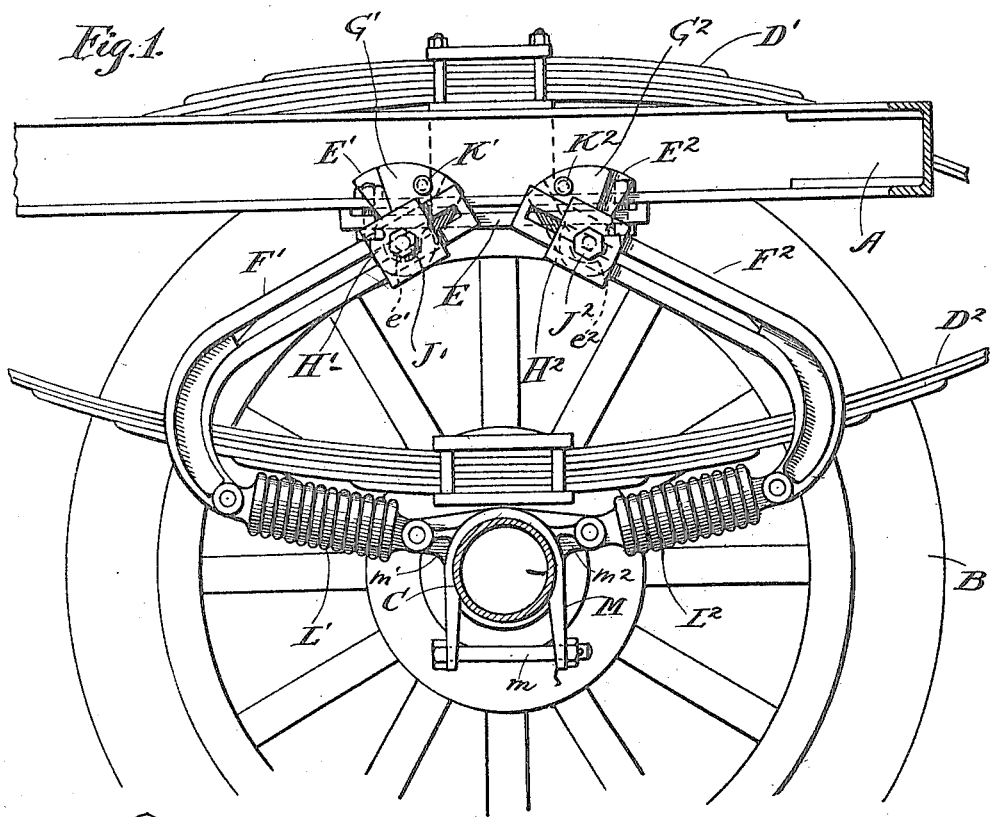
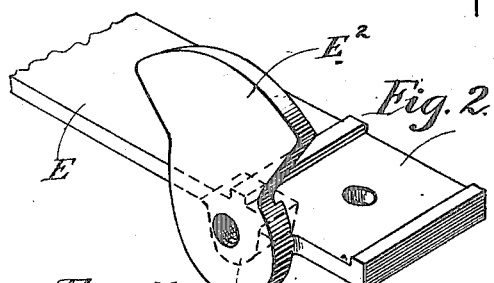
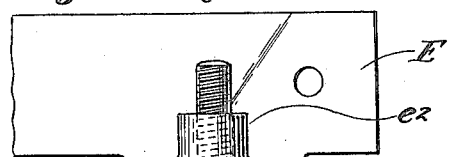
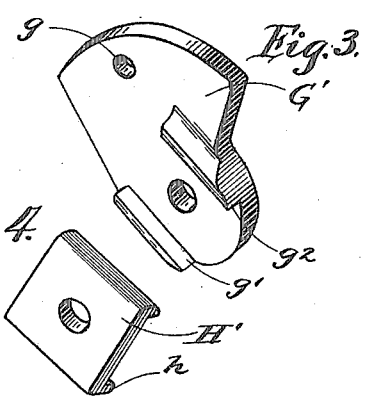
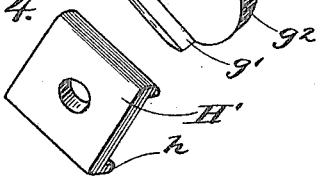
Inventor: Phillip Hien
By Sheridan, Wilkinson & Scott Att'ys
Witnesses: C. E. Burnap, Henry A. Parker

UNITED STATES PATENT OFFICE.

PHILLIP HIEN, OF CHICAGO, ILLINOIS.

AUXILIARY VEHICLE-SPRING.

1,208,157. Specification of Letters Patent. Patented Dec. 12, 1916.

Application filed February 14, 1914. Serial No. 818,781.

*To all whom it may concern:*

Be it known that I, PHILLIP HIEN, a citizen of the United States, residing at Chicago, in the county of Cook and State of Illinois, have invented certain new and useful Improvements in Auxiliary Vehicle-Springs, of which the following is a specification.

My invention relates in general to vehicle springs and more particularly to auxiliary springs for stiffening the usual vehicle springs when subjected to excessive compression and for dampening their recoil.

My present invention is an improvement upon auxiliary vehicle springs of the type covered by my co-pending application Serial No. 664,384, filed December 7, 1911.

Vehicle springs, and more especially automobile springs, of the requisite resiliency for easy riding over roads of ordinary evenness are entirely too flexible to protect the occupants of the vehicle from a sudden jolt incident to the wheel dropping into an unusually deep rut or hitting a large stone or other obstruction, as under such conditions the springs close and immediately recoil, often throwing the occupants of the vehicle from their seats. On the other hand, if the springs are so stiff as not to close under usual road conditions, they are not resilient enough under ordinary road conditions to make the vehicle easy riding.

It has heretofore been proposed to provide shock absorbers to reinforce vehicle springs, particularly automobile springs, but they have not proved practical and satisfactory in use, either because they stiffen the usual springs too much for easy riding over ordinary roads, or because they require frequent adjustment to compensate for wear, or because they are too complicated or inherently too weak to withstand hard usage.

In the invention covered by my co-pending application an auxiliary spring device is provided for supplementing the usual springs of an automobile or other vehicle, which stiffens the usual springs under excessive compression and dampens their recoil without interfering with the resiliency of the usual springs under normal road conditions. In the use of my said invention I have found that the usual springs of an automobile become set after the automobile has been in use for a limited time, and hence the condition of the springs after such use is different from their original condition when the automobile is new, and the relation between the axle and supporting frame of the automobile is correspondingly varied.

The object of my present invention is to provide means for conveniently adjusting my improved auxiliary springs to compensate for the changed condition which occurs in the usual automobile springs after usage.

A further object of my invention is to provide adjustable connections between my auxiliary springs and the parts of the automobile between which they are interposed, so that the auxiliary springs may be maintained in their most effective positions relatively to the axle and frame of the automobile, or other vehicle to which they are applied.

My invention will be more fully disclosed hereinafter with reference to the accompanying drawings in which the same are illustrated as embodied in a convenient and practical form, and in which—

Figure 1 is a side elevational view of my improved automobile spring device applied to an automobile, only such portions of the automobile being shown as are necessary to make a complete disclosure of my invention. Fig. 2 a perspective view of a portion of the supporting plate with which the brackets for the springs are connected. Fig. 3 a perspective view of the oscillatory support for one of the spring brackets. Fig. 4 a perspective view of the clamp between which and the support shown in Fig. 3 the bracket is adjustably secured; and Fig. 5 a plan view of the under side of one end of the supporting plate shown in Fig. 2.

Similar reference characters are used to designate similar parts in the several figures of the drawings.

Reference letter A indicates a portion of the side frame of an automobile chassis, the portion shown being that adjacent one of the rear wheels.

B indicates one of the rear wheels of the automobile and C the rear axle thereof.

$D'$ and $D^2$ designate the upper and lower members of the usual elliptical spring interposed between the rear axle adjacent one end thereof and the overlying portion of the chassis frame. Suitable attaching means are provided for securing the upper member $D'$ of the elliptical spring to the chassis frame and for securing the lower member D² of the elliptical spring to the axle. Neither the form of the elliptical spring nor its attaching means constitute parts of my improvement, and it will be understood when my improvement is described in detail that it may be applied to any usual form of vehicle or automobile, whether having full elliptical springs, half elliptical springs or any other suitable springs interposed between the axles and chassis frame or vehicle body.

E designates a bar secured to the under surface of the frame A above the rear axle, any suitable fastening bolts or rivets being used. The bar E has secured thereto, and preferably formed integrally therewith, two vertical plates E' and E² which project upwardly above, but out of contact with, the inner surface of the frame A. The under surface of the bar E beneath the plates E' and E² is provided with interiorly screw-threaded bosses $e'$ and $e^2$, respectively.

G' and G² designate oscillatory supporting plates pivotally mounted upon bolts J' and J², which engage the screw-threaded bosses $e'$ and $e^2$, respectively. The oscillatory plates G' and G² are adapted to overlie and to be adjusted relatively to the plates E' and E² fixed to the bar E.

H', H² designate clamps between which and the adjacent oscillatory plates G', G² extend the upper slotted ends of brackets F' and F². The plates G' and G² are provided with ribs $g'$ and $g^2$ while the clamps H' and H² are provided with side flanges $h$, so as to tightly grip the interposed portions of the brackets F' and F². The bolts J', J² pass through the respective clamping plates H' and H² and also through the slots in the brackets F', F², before passing through and into screw-threaded engagement with the bosses $e'$ and $e^2$.

The brackets F' and F² are preferably curved at their lower ends and are secured to the outer ends of coiled springs L' and L², the inner ends of said coil springs being secured to the axle L through the medium of a suitable bracket M tightly clamped to the axle by means of a bolt $m$.

$m'$, $m^2$ designate lugs projecting from the opposite sides of the U-shaped bracket M and to which the inner ends of the springs are pivotally connected.

The manner of using and operation of my invention are as follows: The bolts J' and J² are rotated with respect to their supporting bosses $e'$ and $e^2$ sufficiently to unclamp the brackets F', F², so that they may be adjusted longitudinally with respect to the bolts, and so that the plates G' and G² may be oscillated about the bolts. The brackets are adjusted relatively to the bolts, and the plates G' and G² are oscillated upon the bolts so as to locate the springs in the proper relation to the axle, such relation being substantially as indicated in Fig. 1 in which the springs are inclined slightly upwardly from the horizontal. The bolts J' and J² are then tightened so as to immovably grip the brackets between the respective clamps and oscillatory plates, and so as to tightly press the oscillatory plates against the fixed plates E' and E². When the desired adjustment has been made as above explained, a hole is bored in each of the fixed plates E' and E² to register with a hole $g$ in the overlying oscillatory plate. A pin or bolt K is then passed through the registering holes in the fixed and movable plates, thereby rigidly locking the oscillatory plates in fixed positions.

When through the use of the automobile the elliptical springs become set, and it thereby becomes necessary to readjust the auxiliary springs, the bolts J' and J² are loosened and the pins or bolts K removed. The brackets are then adjusted so as to impart to the auxiliary springs the desired relation to the axle, after which the bolts J' and J² are again tightened and other holes drilled through the fixed plates E' E² to register with the holes $g$ in the new positions to which they have been moved relatively to the fixed plates by reason of the oscillatory adjustment of the movable plates. The bolts K are then again applied so as to rigidly lock the oscillatory plates to the fixed plates.

It will be observed that by means of the two adjustments, namely, the brackets longitudinally of the bolts and the oscillatory supporting plates about the bolts, the lower ends of the brackets to which the outer ends of the auxiliary springs are connected, may be located in any desired position with respect to the axle necessary to impart to the springs the desired positions, such adjustments serving to compensate for any set in the usual vehicle springs and also for any elongation, should any occur, in the auxiliary springs themselves.

The auxiliary springs are adjusted in the manner above described so as to normally, when the automobile is unloaded, occupy slightly inclined position as shown in Fig. 2, so that when the automobile contains its average load the auxiliary springs will horizontally aline. The auxiliary springs are consequently inactive when the vehicle carries its normal load and the usual vehicle springs are subjected to the compressions incident to a normal load. During the travel of the vehicle over roads having only ordinary unevenness, the usual vehicle springs slightly compress and recoil without being appreciably stiffened by the auxiliary springs, when, however, the regular vehicle springs are subjected to excessive compression, as for instance when the wheel drops into a rut, or hits a large obstacle, the outer and inner ends of the auxiliary springs are relatively moved a considerable distance, thereby distending such springs in proportion to the compression of the main vehicle springs. A gradually increasing resistance is consequently exerted to the compression of the regular springs, as well as a gradually increasing resistance to the recoil of the main springs which immediately follows their compression.

From the foregoing description, it will be observed that I have invented an improved device for reinforcing the usual springs of a vehicle, and more particularly an automobile, whereby excessive compression of the vehicle springs is retarded, and also the excessive recoil thereof retarded, without interfering with the resiliency of the regular vehicle springs when traveling over normal roads. It will be further evident that my improved device may be applied to vehicles when made, or may be applied to vehicles already in use in a simple and convenient manner.

While I have illustrated and described my improvement as applied to a vehicle, yet it will be understood that it may be used to reinforce springs interposed between any two relatively movable members, and while I have described more or less in detail the specific form in which I have illustrated my invention as embodied, yet I do not wish to be understood as limiting myself thereto, as I contemplate changes in form, proportion of parts, and substitution of equivalents, as circumstances may require, or as may be deemed expedient.

I claim:

1. The combination with a vehicle comprising relatively movable parts and interposed springs, of a device for supplementing the action of the vehicle springs comprising a pair of normally substantially alined auxiliary springs, means for securing the inner ends of said auxiliary springs to one of the relatively movable vehicle parts, brackets for securing the outer ends of said auxiliary springs to the other of the relatively movable vehicle parts, means for oscillating said brackets to vary the relative positions of the ends thereof to which the outer ends of the auxiliary springs are connected, and means for retaining said brackets in their adjusted positions.

2. The combination with a vehicle comprising relatively movable parts and interposed springs, of a device for supplementing the action of the vehicle springs comprising a pair of normally substantially alined auxiliary springs, means for securing the inner ends of said auxiliary springs to one of the relatively movable vehicle parts, brackets for securing the outer ends of said auxiliary springs to the other of the relatively movable vehicle parts, means for oscillating said brackets to vary the relative positions of the ends thereof to which the outer ends of the auxiliary springs are connected, means for adjusting the point of oscillation of said bracket, and means for retaining said brackets in their adjusted positions.

3. The combination with a vehicle comprising relatively movable parts and interposed springs, of a device for supplementing the action of the vehicle springs comprising a pair of normally substantially alined auxiliary springs, means for securing the inner ends of said auxiliary springs to one of the relatively movable vehicle parts, brackets for securing the outer ends of said auxiliary springs to the other of the relatively movable vehicle parts, an oscillatory support for each of said brackets, and means for securing said support in any position to which it may be oscillated.

4. The combination with a vehicle comprising relatively movable parts and interposed springs, of a device for supplementing the action of the vehicle springs comprising a pair of normally substantially alined auxiliary springs, means for securing the inner ends of said auxiliary springs to one of the relatively movable vehicle parts, brackets for securing the outer ends of said auxiliary springs to the other of the relatively movable vehicle parts, an oscillatory support for each of said brackets, means for adjusting said brackets relatively to their supports, and means for securing said supports in any positions to which they may be oscillated.

5. The combination with a vehicle comprising relatively movable parts and interposed springs, of a device for supplementing the action of the vehicle springs comprising a pair of normally substantially alined auxiliary springs, means for securing the inner ends of said auxiliary springs to one of the relatively movable vehicle parts, brackets for securing the outer ends of said auxiliary springs to the other of the relatively movable vehicle parts, an oscillatory supporting plate for each of said brackets, a fixed plate adjacent the path of oscillation of each of said supporting plates, and means for rigidly connecting each oscillatory plate to the adjacent rigid plate in any positions to which they may be relatively oscillated.

6. The combination with a vehicle comprising relatively movable parts and interposed springs, of a device for supplementing the action of the vehicle springs comprising a pair of normally substantially alined auxiliary springs, means for securing the inner ends of said auxiliary springs to one of the relatively movable vehicle parts, brackets for securing the outer ends of said auxiliary springs to the other of the relatively movable vehicle parts, an oscillatory supporting plate for each of said brackets, a fixed plate adjacent the path of oscillation of each of said supporting plates, means for rigidly connecting each oscillatory plate to the adjacent rigid plate in any positions to which they may be relatively oscillated, and means for adjusting said brackets relatively to their oscillatory supporting plates.

7. The combination with a vehicle comprising relatively movable parts and interposed springs, of a device for supplementing the action of the vehicle springs comprising a pair of normally substantially alined auxiliary springs, means securing the inner ends of said springs to one of the relatively movable vehicle parts, means for securing the outer ends of said springs to the other of the relatively movable vehicle parts, and means for permanently vertically and laterally relatively adjusting the outer and inner ends of said auxiliary springs.

In testimony whereof, I have subscribed my name.

PHILLIP HIEN.

Witnesses:
GEO. L. WILKINSON,
HENRY A. PARKS.

Copies of this patent may be obtained for five cents each, by addressing the "Commissioner of Patents, Washington, D. C."